(No Model.)

W. A. ORR & B. S. REYNOLDS.
WHEEL.

No. 523,150. Patented July 17, 1894.

Witnesses
Severance
Will Harry Muzzy

Inventors
William A. Orr
Benjamin S. Reynolds
by Messrs. Fenwick & Lawrence
Their Attorneys

UNITED STATES PATENT OFFICE.

WILLIAM A. ORR AND BENJAMIN S. REYNOLDS, OF SCRANTON, PENNSYLVANIA.

WHEEL.

SPECIFICATION forming part of Letters Patent No. 523,150, dated July 17, 1894.

Application filed January 25, 1894. Serial No. 498,047. (No model.)

*To all whom it may concern:*

Be it known that we, WILLIAM A. ORR and BENJAMIN S. REYNOLDS, citizens of the United States, residing at Scranton, in the county of Lackawanna and State of Pennsylvania, have invented certain new and useful Improvements in Accommodating Wheels; and we do hereby declare the following to be a full, clear, and exact description of the invention, such as will enable others skilled in the art to which it appertains to make and use the same.

Our invention relates to improvements in spring accommodating wheels and has more particularly to do with wheels used on railway cars or engines, carriages or wagons, or pulley wheels on power shafting, although it may be used for any other analogous purposes; and the objects of the invention are, first: to provide a wheel that will absorb shocks or concussions; second, to provide a wheel which is capable of moving up and down, assuming an inclined position and moving laterally irrespective of the axle on which it is mounted, and third, to provide a wheel capable of slight rotation independent of the said axle. We accomplish these objects by the devices described in the following specification and illustrated in the accompanying drawings, in which latter—

Figure 1:
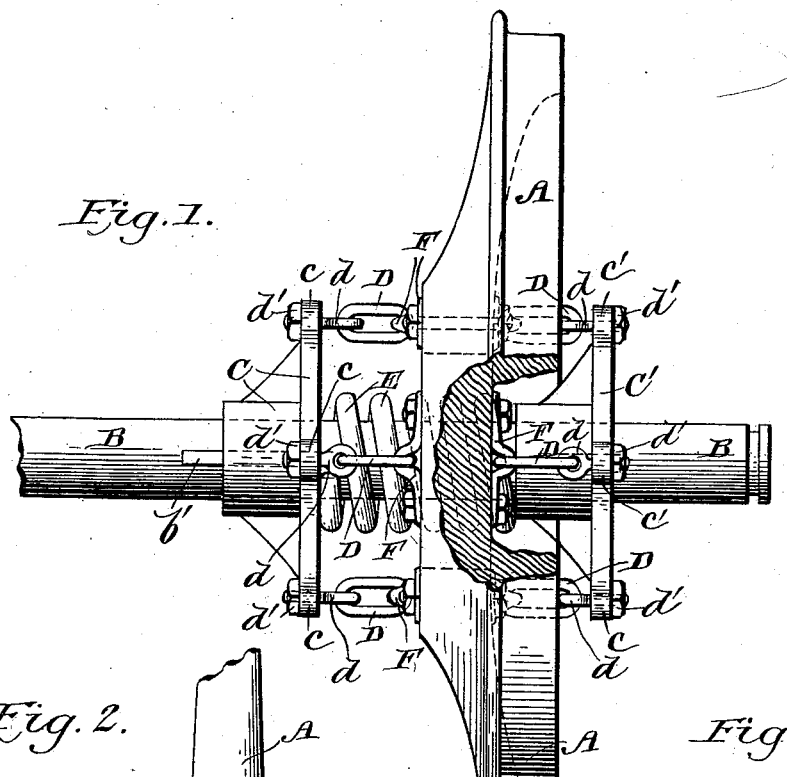
Figure 2:
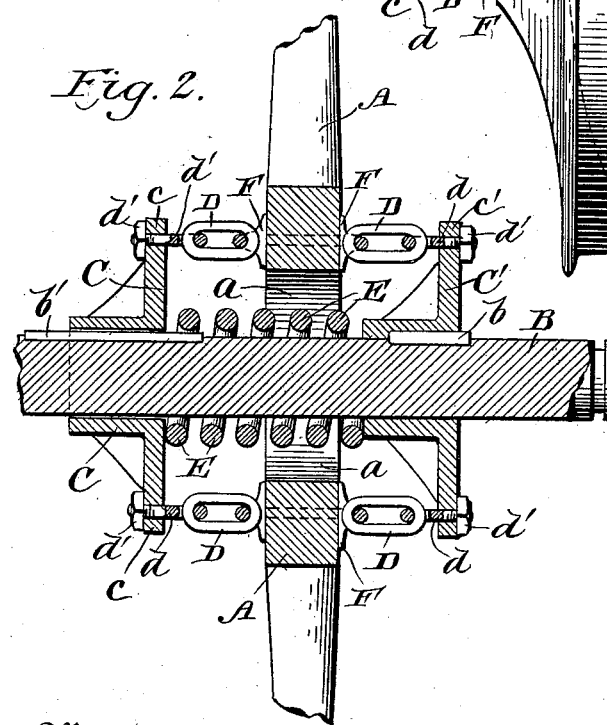
Figure 3:
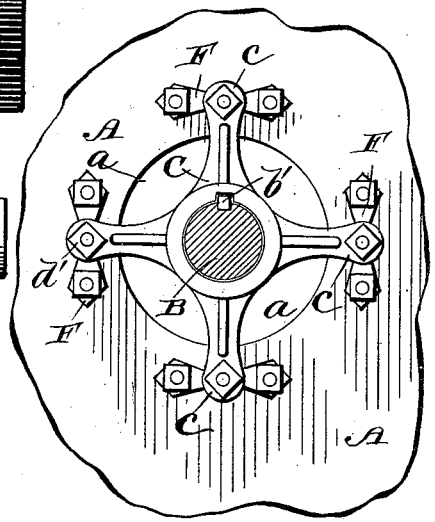

Figure 1. represents a side elevation, partly broken away, of the devices embodying our invention as applied to a car wheel. Fig. 2. represents a detail central vertical section of the invention, also applied to a wheel and axle, and Fig. 3. represents a detail end elevation, partly in section, showing the shape of one of the hubs and the link attaching brackets.

A, in the drawings, represents a car wheel, and B its axle; the latter passing centrally through but not engaging the wall of an aperture or eye $a$ cut in the center of the said wheel. Upon this axle are mounted two spider shaped hubs C, C'; said hubs being on opposite sides of the wheel, and provided with four arms $c$ and $c'$ respectively, by means of which arms, together with links D, the said hubs are flexibly connected to the said wheel. The hub C' is rigidly keyed to the axle B by a key $b$, but the hub C is capable of longitudinal movement on the said axle, by reason of its having a feather connection $b'$ therewith.

Between the hubs C, C', is placed a coil spring E, which is normally longer than the distance between the hubs, but is compressed so as to be only as long as said distance between the hubs, when the same are placed in position, and thus the links D connecting the hubs to the wheel, are held normally horizontal, and the hubs connected thereto forced outward. The end of each of the spider arms $c, c$, is perforated and a screw eye $d$ passed therethrough and secured thereon by means of nuts $d'$. These screw eyes are each connected to the wheel by the aforesaid links D which latter are secured to said wheel by means of attaching plates F. It will be seen that both hubs rotate with the axle, but, while this is so, the hub C can move longitudinally on the axle while the hub C' is held rigidly thereto.

Any weight brought to bear upon the axle B will cause the same to descend, this downward movement being permitted by the accommodating connecting links between the hubs and the wheel. This downward movement of the axle will cause the links D to assume a diagonal position, and thus draw the hub C inward and thereby compress the spring E.

In placing the spring E on the axle, the normal weight of the load to be carried by the car must first be considered, as the spring should be of such tension that it will hold the links D very nearly in their normal horizontal position when the load is on the car, and said links shall not move from such horizontal position except when some concussion or shock occurs, such as an irregular rail joint or other unevenness in the track.

In passing around a curve, when our invention is employed, the car body and axle will not assume a position at direct right angles to the leaning or inclined wheels, but the axle will be permitted to work slightly out of right angles to the wheels, by reason of the before mentioned construction. The wheel is also capable of a slight lateral movement outward on the axle but none inward.

Under the ordinary construction of railway car wheels with both wheels keyed rigidly to the axle, there is a great strain on the same when a car is rounding a curve, because the outer wheel, of course, moves faster than the inner one, and the latter being keyed to the same axle and not being capable of making as many rotations as the outer one, one or the other must of course slip on the rails. With our construction of spring connection between axle and wheels, this strain is greatly diminished as the wheels are capable of slight rotation independent of each other.

When our invention is applied to the driving wheels of a locomotive, the slipping of the drivers in starting and stopping is lessened, as there is not a direct rigid connection between the power applied on the axle and the rail, but a spring accommodating connection which will greatly assist the wheels in getting a grip on the track.

When the invention is used on shafting as a pulley or belt wheel or other transmitter of power, the effect is the same as above stated, that is, there is a spring accommodating or compensating connection between the application of the power and the point at which it is used and thus machinery or whatever is to be operated will not start or stop with a jerk or shock.

The wheel can of course be applied to carriages and wagons as well as other vehicles.

What we claim as our invention is—

1. In a spring accommodating wheel, the combination with the wheel proper, of an axle, hubs mounted on said axle and adapted to rotate therewith, flexible connection between said hubs and said wheel, and a spring for keeping said hubs apart, whereby said axle is capable of movement independent of said wheel, substantially as described.

2. In a spring accommodating wheel, the combination with the wheel proper, of an axle, hubs mounted on said axle and adapted to rotate therewith, and one of the same being capable of longitudinal movement thereon, links connecting said hubs and said wheel and a spring for keeping said hubs apart and said links horizontal, whereby said axle is capable of movements independent of the wheel while under spring tension, substantially as described.

3. A wheel provided with an eye larger than the axle or shaft to which it is applied and connected by accommodating links to hubs or bearings of the axle between which hubs or bearings a concussion spring is applied, substantially as described.

In testimony whereof we hereunto affix our signatures in presence of two witnesses.

WILLIAM A. ORR.
BENJAMIN S. REYNOLDS.

Witnesses:
FOREST DERSHIMER,
B. G. MORGAN.